…

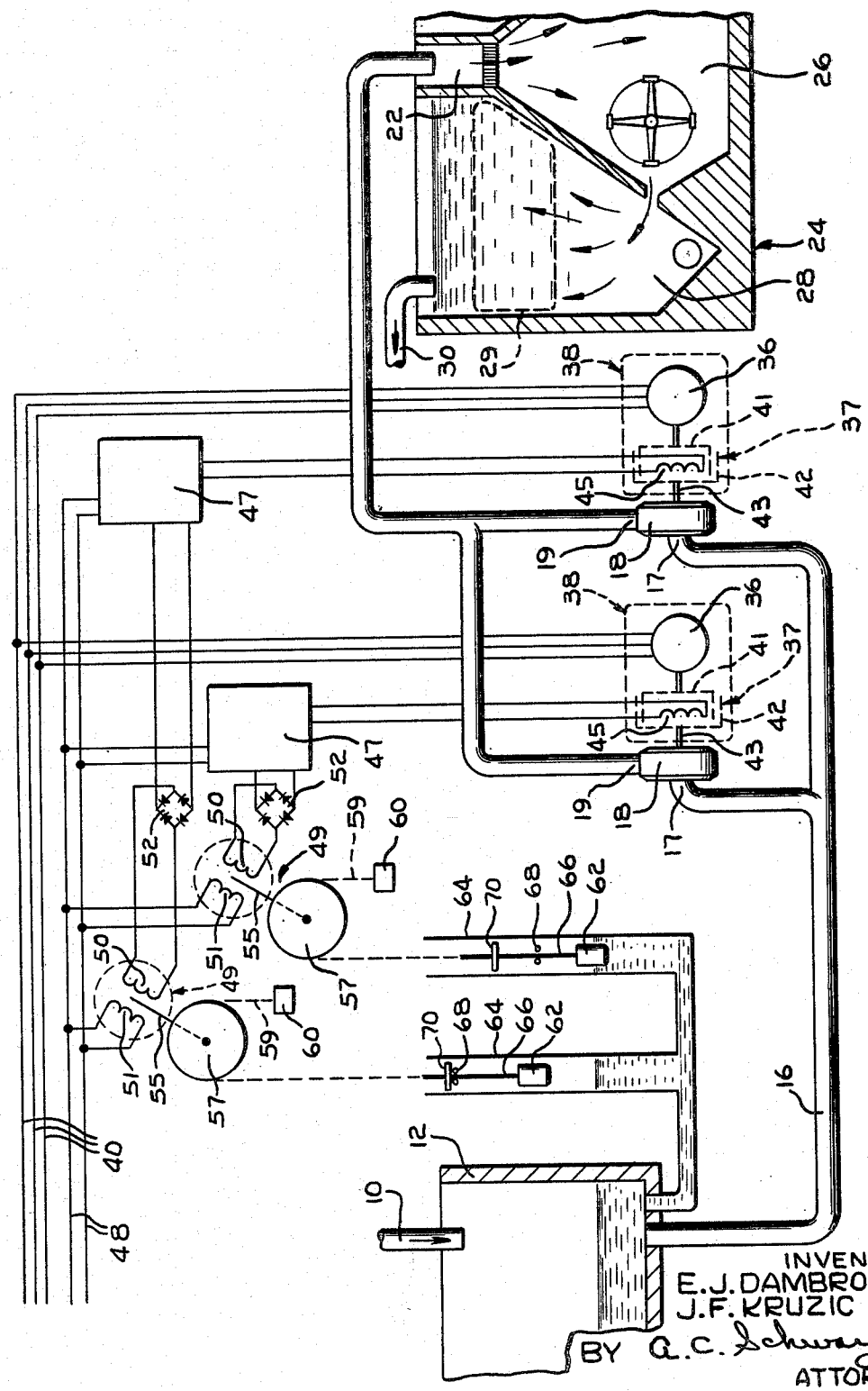

United States Patent Office 3,131,636
Patented May 5, 1964

3,131,636
LIQUID TRANSFERRING SYSTEM
Edward J. Dambrogio, Elmhurst, and John F. Kruzic, North Riverside, Ill., assignors to Western Electric Company, Incorporated, New York, N.Y., a corporation of New York
Filed June 8, 1962, Ser. No. 201,202
1 Claim. (Cl. 103—11)

This invention relates to liquid transferring systems, and more particularly to a system for controlling the flow of water from a receiving tank to a clarification tank at a variable rate proportional to the amount of water in the receiving tank and at a gradual rate of change.

One type of water clarification system used with a battery of pulp machines for insulating electrical conductors includes a water receiving tank for receiving the waste water from one or more of the pulp machines at different times. The water is pumped from the receiving tank to one chamber of a clarification tank from which the water flows into the lower portion of a precipitation chamber in the upper portion of which is suspended a floc blanket of gelatinous material for filtering the water and separating the waste particles therefrom as the water moves upwardly and is withdrawn from the top of the chamber. For the most efficient operation of the system it is essential that the water be pumped from the receiving tank at a rate in proportion to the volume of the water therein and that the rate of change of flow of the water pumped from the receiving tank to the clarification tank be gradual and without sudden increase or decrease in order not to damage or upset the filter blanket and thereby render the clarification tank ineffective.

An object of the invention is to provide an improved system for transferring liquid from a first tank to a second tank at a variable rate of flow proportional to the volume of the liquid in the first tank and at a gradual rate of change.

A system illustrating certain aspects of the invention for transferring liquid from a receiving tank to a clarification tank at a variable rate of flow proportional to the amount of the water in the receiving tank and at a gradual rate of change may include a pump communicating with the tanks and driven by a motor operating at a constant speed and connected to the pump through an adjustable magnetic clutch. A float responsive to the level of the liquid in the receiving tank actuates a variable induction device which controls a power supply and varies the current supplied to the electromagnetic clutch and the excitation thereof and thus effects the gradual acceleration and deceleration of the pump between zero and maximum speeds.

Where the volume of the liquid is so large as to require a plurality of pumps, the required number of such pumps, and the associated motors, electromagnetic clutches and control mechanisms therefor, including the variable inductors and floats, are provided, and the floats are arranged at different elevations to operate successively through a predetermined range at successive levels of the liquid in the receiving tank to sequentially actuate the variable induction devices and thus render the pumps sequentially operative and unoperative and also effect the gradual acceleration and deceleration of the pumps between zero and maximum speeds.

Other objects, advantages and novel aspects of the invention will become apparent upon consideration of the following detailed description, in conjunction with the accompanying drawing, in which the single drawing is a fragmentary diagrammatic view of a system for transferring water from a receiving tank to a clarification tank.

Referring to the drawing, waste water from a battery of pulp insulating machines flows through a pipe 10 into a receiving tank 12. The waste water may be emptied into the tank 12 from one or a plurality of pulp insulating machines at various times and the volume of the water in the tank will vary from time to time and be proportional to the level thereof in the tank. From the receiving tank 12 the waste water flows through a pipe 16 to the intake 17 of one or more pumps 18, and from the outlet 19 of the pumps, the water is directed into the influent distributor flume 22 of a clarification tank 24.

Chemicals are added to the water in the flume 22 and the water and chemicals pass downwardly therefrom into an inner chamber 26 in the tank 24. Agitated by slowly rotating paddle wheels, the waters and chemicals pass from the inner chamber into the lower portion of an outer chamber 28 which has upwardly diverging bottom walls and in which the chemicals form a blanket 29 of floc that is suspended in the water in the upper portion of the chamber. As the waste water moves upwardly at a progressively decreasing rate of movement in the chamber 28 and in the floc blanket 29, foreign particles are separated therefrom and the filtered water rises to the upper level of the tank and is withdrawn therefrom through a pipe 30.

Each of the pumps 18 is driven by an electric motor 36 which is connected to the pumps through an electromagnetic clutch 37. The motor 36 and electromagnetic clutch 37 preferably are of a commercially available type of adjustable-speed drive unit 38 in which the motor and the clutch are built as a unitary structure.

As indicated diagrammatically in the drawing, each motor 36 is connected to a source of electrical power 40 and rotates at a constant speed and is connected to a driving member 41 of the electromagnetic clutch 37. Cooperating with the driving member 41 of the electromagnetic clutch is a driven member 42 having an output shaft 43 to which the pump 18 is connected. The electromagnetic clutch is provided with a field coil 45 capable of being energized to effect a magnetic driving connection between the driven and driving members 41 and 42 proportional to the extent of excitation of the field coil 45.

The coil 45 is connected to a variable D.C. power supply unit 47 which is connected to a source of A.C. 48. The variable D.C. power unit 47 may be of any well-known conventional type in which the D.C. power output thereof may be altered by a variable D.C. control voltage supplied thereto by a variable induction unit 49 to vary linearly the excitation of the coil 45 and the magnetic coupling between the clutch members 41 and 42, and thereby vary the speed of the pump 18 associated therewith from zero to maximum speeds.

The variable induction unit 49 is of a commercially available type which comprises a fixed coil 50 and a movable coil 51 inductively coupled together. The coil 51 is connected to the source of A.C. 48 and is rotatable relative to the stationary coil 50 to induce a voltage in the latter that varies linearly from zero to a predetermined maximum in response to movement of the movable coil 51 through a predetermined angle (90°). The A.C. voltage induced in the coil 50 is rectified by a rectifier 52 and the rectified variable D.C. voltage serves as the control potential for varying the D.C. power output of the variable power unit 47 to the field coil 45.

The movable coil 51 of each of the induction units 49 is secured to a shaft 55 which is rotatably mounted in a suitable stationary support and has a pulley 57 secured thereto. A chain or other elongated flexible member 59 is supported on the pulley 57 and has one end thereof connected to a counterweight 60 and the other end thereof operatively connected to a float 62. The float 62 is movable vertically in a stand pipe 64 which communicates with the lower end of the tank 12 for receiving the water therein. As the level of the water rises and falls, the float 62 will rise and fall accordingly and impart rotary movement to the pulley 57 and the movable induction coil 51. This in turn will vary the extent of energization of the electromagnetic clutch 37, the speed of the pump 18, and the rate of flow of water into the clarification tank 24.

It will be understood that where the system is relatively small, the provision of one pump and drive therefore is sufficient, but where the system is large, a plurality of pumps and drives therefore are provided, two being shown in the present disclosure of the invention. As depicted in the drawing, the floats 62 are offset vertically relative to one another and are actuated through a predetermined range in sequence. Preferably, each float is attached to a rod 66 which extends upwardly a predetermined distance from the float and is attached to the chain 59. The rod passes between a pair of stop pins 68 fixed to the stand pipe 64 for engaging the float 62 and limiting its upward movement and for engaging a collar 70 secured to the rod 66 for limiting the downward movement of the float.

In the operation of the system, as water initially flows into the receiving tank 12 and the level thereof rises, the lowermost float 62 rises therewith and effects the rotation of the associated pulley 57 and the movable coil 51, and the induction of a variable A.C. control voltage in the stationary coil 50. The variable A.C. control voltage is rectified and serves to vary the D.C. output of the power supply unit 47, the excitation of the field coil 45 of the electromagnetic clutch 37, and the speed of the pump 18 in proportion to the volume of the water in the receiving tank 12.

As the water level in the tank 12 rises to a preestablished point, corresponding to the maximum output of the first pump 18, and continues to rise beyond this point, the second or upper float 62 will become operative and will rise with the water and effect the operation of the induction control unit 49 associated therewith, thereby initiating the operation of the second pump 18 at the minimum starting speed, and the two pumps are concurrently operative. As the water continues to rise in the tank 12, the second float will continue to rise therewith resulting in a gradual increase in the speed of the second pump and the rate of flow of water from the receiving tank 12 to the clarification tank 24.

The level of the water in the receiving tank 12 fluctuates as the volume of water in the tank increases and decreases. As the water is pumped from the tank and the volume decreases, the water level is lowered and the second float 62 is lowered accordingly. This effects the reverse rotation of the pulley 57 and the movable coil 51 of the induction device 49 associated therewith, resulting in the reduction in the energization of the electromagnetic clutch and the reduction in the speed of the second pump in proportion to the reduction in volume of the water in the tank. The reduction in the speed of the pump continues gradually and rotation thereof comes to a stop when the water level falls to the pre-established point, corresponding to the maximum output of the first pump. In response to continued lowering of the water level below this point, the first float is lowered correspondingly and effects the reverse rotation of the pulley 57, the reverse actuation of the induction device 49, and a corresponding reduction in speed of the first motor 18 in accordance with the reduction in volume of the water in the tank 12.

While the present water pumping system has been disclosed as having a pair of pumps for pumping the water from the receiving tank to the clarification tank, it will be understood that one, two, or more pumps and their associated drives and controls may be employed, and that the floats associated with the several pumps will be disposed in vertically spaced relation to one another at successive levels so as to render the pumps successively operative and inoperative in response to the change in volume and level of the water in the tank, and that any change in the speed of the pumps will be gradual as they accelerate and decelerate between zero and maximum speeds.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

A system for transferring liquid from a first tank to a second tank at a variable rate proportional to the volume of liquid in the first tank and at a gradually increasing or decreasing rate of change which comprises:

a plurality of pumps each having an intake communicating with the first tank and an outlet communicating with the second tank;

electric motors individual to said pumps and driven at a constant speed;

electromagnetic clutches individual to said motors and forming a variable speed driving connection between said motors and said pumps and each having a field coil;

inductors individual to said electromagnetic clutches, each of said inductors comprising a pair of coils mounted for rotary movement of one coil relative to the other into and out of inductive relation to each other and with one coil connected to and energized from a source of A.C. for inducing in the other coil an A.C. control voltage variable linearly from zero to a predetermined maximum;

means for rectifying the A.C. control voltage to produce a D.C. control voltage;

electrical power means individual to said electromagnetic clutches and responsive to said D.C. control voltage for supplying D.C. current variable linearly from zero to a predetermined maximum to the field coil of the electromagnetic clutch;

floats individual to said inductors and arranged in vertically spaced relation to one another for successive operation each through a predetermined distance as the level of the liquid changes in the first tank; and means individual to said inductors and actuated by the float associated therewith for effecting rotation of said movable coil.

References Cited in the file of this patent

UNITED STATES PATENTS

| | | |
|---|---|---|
| 998,647 | Smith | July 25, 1911 |
| 2,733,660 | Towle | Feb. 7, 1956 |
| 2,850,654 | Jaeschke | Sept. 2, 1958 |
| 2,972,071 | Leonard | Feb. 14, 1961 |
| 3,024,730 | Towle | Mar. 13, 1962 |